May 24, 1938.　　　C. V. McINTIRE　　　2,118,095
PROCESS AND APPARATUS FOR MAKING CARBURETED WATER GAS
Filed July 24, 1934
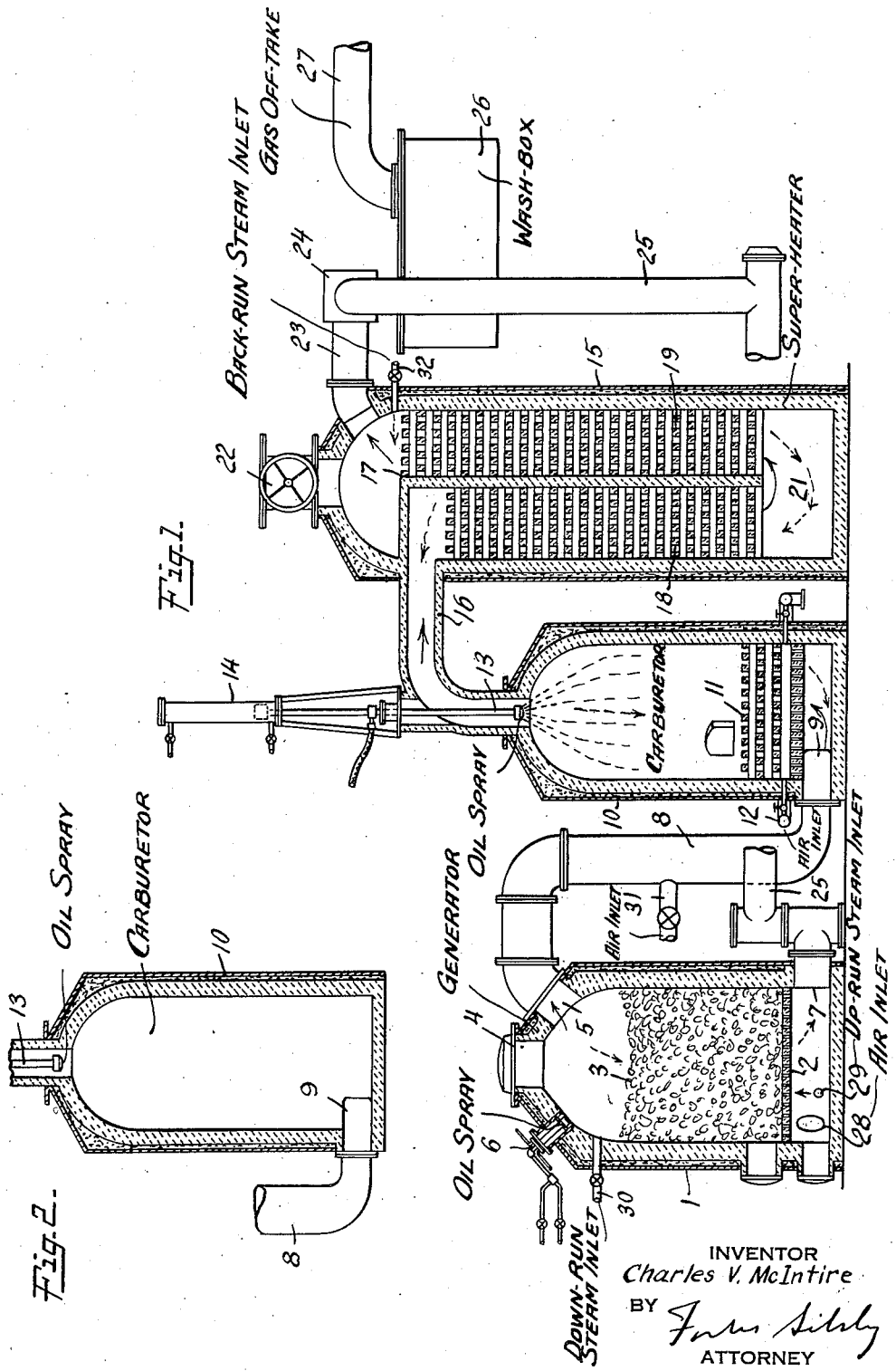
INVENTOR
Charles V. McIntire
BY
ATTORNEY

UNITED STATES PATENT OFFICE 2,118,095

PROCESS AND APPARATUS FOR MAKING CARBURETED WATER GAS

Charles V. McIntire, Short Hills, N. J., assignor to Semet-Solvay Engineering Corporation, New York, N. Y., a corporation of New York Application July 24, 1934, Serial No. 736,649

7 Claims. (Cl. 48—205)

This invention is directed to carbureted water gas operations, and more particularly, to the production of carbureted water gas employing Bunker-C or other heavy oils forming carbonaceous deposits to enrich the blue gas.

An object of this invention is to provide a process of making carbureted water gas in a carburetor of such design as to promote efficient intermixture of oil gas and water gas and permit the efficient utilization of crude or heavy oils as enriching media. Another object is to provide a procedure of making carbureted water gas employing crude or heavy oils for carbureting the water gas which procedure may be practiced in existing water gas sets without requiring extensive reorganization thereof.

Other objects and advantages will appear from the following detailed description.

Heretofore, the usual water gas set consisted of a generator containing a bed of fuel, a carburetor and a superheater connected in series with the generator. The interiors of both the carburetor and the superheater were built up with checkerbrick material arranged in staggered relation to form tortuous flues or a carburetor devoid of checkerbrick was employed. In the manufacture of water gas, the blast gases produced in the generator by the passage of air or other oxygen-containing gas through the fuel bed therein, were discharged from the generator and passed into and through the carburetor and superheater. Secondary air admitted to the carburetor and the superheater was admixed with the blast gases and this mixture was burned in these chambers to heat them. This blasting cycle was usually of approximately three minutes duration.

Thereafter, the blasting cycle was discontinued and the steam, admitted into the generator, passed therethrough reacting with the fuel bed therein to produce water gas which was passed into and down through the carburetor. Oil was introduced into the top of the carburetor, the resultant oil gas mixing with the water gas passing over the checkerbrick therein. The mixture of oil gas and water gas, in its passage through the carburetor and superheater chambers, was fixed to form carbureted water gas. Thereafter, if desired, steam was passed in reverse flow down through the superheater, up through the carburetor, and down through the fuel bed in the generator, the resultant water gas being withdrawn directly from the base of the generator. When the temperatures of the fuel bed and the carburetor and superheater chambers had been reduced so that water gas could no longer be generated, the gas-making cycles where discontinued and the fuel bed again blasted with air or other oxygen-containing gas, and upon completion of this blasting cycle, the water gas-making cycles were repeated.

In contradistinction to the above operations, the water gas procedure of this invention involves the upflow of water gas through a carburetor preferably provided with checker material at the base portion which functions to effect immediate ignition of the air and blast gases entering the carburetor. Oil, preferably heavy oil, is introduced at the top of the carburetor, preferably by means of a centrally located spray. Hence, the carburetor operates on the true counter flow principle, the hot gases rise while the liquid oil particles fall vertically, each fluid following its natural flow tendency. Tar and carbon formed upon decomposition of the oil fall on the hot checkerbrick at the base of the carburetor in the most available form for effective combustion. The hot blast gases and flames playing on these surfaces during the blasting cycle maintain the checkerbrick at the base of the carburetor at high temperatures with resultant substantially complete and smokeless combustion of the tar and carbonaceous deposits. Combustion of these deposits adds luminosity to the blast gas flames and results in the rapid radiation of heat to the walls of the carburetor. In the case of most heavy oils employed, the secondary air admitted with the blast gases will support combustion of the carbonaceous deposits formed during a carbureted water gas making cycle and additional air need not be admitted at the base of the carburetor. However, in the case of oils forming exceptionally large carbonaceous deposits, additional air may be admitted at the base of the carburetor to support combustion of such deposits.

From the carburetor, the carbureted water gas passes into a superheater which is divided by a baffle or vertical partition into two passes. Hence, additional resistance to the flow of gas through the superheater results, with consequent increased turbulence in the gas stream and better distribution of the water gas through the checkerbrick in the superheater. This causes more efficient transfer of heat in the superheater between hot checkers and the gases passing therethrough. The resistance to the flow of blast gases through the superheater due to the two-pass arrangement creates a back pressure impeding the flow through the carburetor with consequent improvement in the combustion of blast gases passing therethrough and more effective heat utilization of the blast gases to heat the carburetor.

During the succeeding backrun cycle, the steam is passed through the superheater, down through the carburetor, the resultant superheated steam passing over the checkers at the base of the carburetor and then into the top of the generator where crude or heavy oil may be introduced. The mixture of oil and steam passes through the fuel bed producing a carbureted water gas which is withdrawn from the base of the generator. The steam is superheated by passage over the checkers in the superheater and through the top portion of the carburetor and hence is at an elevated temperature and exerts a maximum cleaning effect on the checkers at the base of the carburetor.

In the accompanying drawing forming a part of this specification and showing for the purpose of exemplification preferred forms of this invention but without limiting the claimed invention to such illustrative instances—

Fig. 1 is a vertical section, partly in elevation of a water gas set embodying principles of this invention, and Fig. 2 is a fragmentary detail of a modified form of carburetor which may be employed in place of the carburetor shown in Fig. 1.

Referring to the drawing, reference numeral 1 indicates a water gas generator which may be of conventional type provided with a grate 2 for supporting a bed of fuel 3 such as coal or coke. The generator is provided at its top with a charging opening 4, a gas outlet 5, a spray 6 for admitting oil to the top of the fuel bed and a downrun gas outlet 7.

Gas outlet 5 of the generator is connected by means of a pipe or conduit 8 with an inlet 9 at the base of the carburetor 10. Inlet 9 is of restricted cross-section as compared with the cross-section of pipe 8 and is located at the floor level so that entering gas is caused to contact with the floor of the carburetor. As shown in Fig. 1, carburetor 10 is provided at its base portion with layers of checkerbrick 11 and is otherwise unobstructed. In the neighborhood of the checkerbrick exteriorly of the carburetor, a bustle pipe 12 provided with air inlets is disposed to admit air or other oxygen-containing gas to the checkerbrick to support combustion during the blasting cycle of carbonaceous deposits thereon. In the side wall of the carburetor, just above the checkers, a cleanout opening adapted to be closed by a door may be provided. At the top of the carburetor, in alignment with the longitudinal axis thereof is an oil spray 13 which may be retracted from the carburetor by mean of a hydraulic cylinder 14. As shown in the drawing, the carburetor is of sufficiently large diameter to insure passage of liquid oil introduced through the spray 13 down through the carburetor countercurrent to the upwardly flowing water gas stream without contacting the liquid oil with the walls of the carburetor.

The carburetor communicates with a superheater 15 by means of a conduit or pipe 16 leading from the top of the dome portion of the carburetor into the side of the superheater. The generator, carburetor and superheater, it will be noted, are located in separate and detached shells. The superheater is formed with a baffle or partition 17 which may be of refractory material and which is disposed to divide the superheater into two passes 18 and 19 communicating at 21. Each pass 18 and 19 is filled with checkerbrick. The top of the superheater may be provided with a stack valve 22 and a gas outlet 23 leading into a housing 24. Backrun pipe 25 leads from the downrun gas offtake 7 of the generator to the housing 24 which has pivotably mounted therein a three-way valve arranged to be moved by hydraulic cylinder or other mechanism to interrupt flow from the superheater outlet and permit flow through the backrun line 25 or to close line 25 and open line 23. The housing 24 communicates with a washbox 26 equipped with gas offtake 27.

The generator may be provided with inlets 28 for introducing uprun air or other oxygen-containing gas for blasting, inlet 29 for introducing uprun steam, and line 30 for introducing downrun steam thereinto. Reference numeral 31 indicates air inlet for admitting secondary air into the connection 8 between the generator and carburetor to support combustion of the blast gases passed from the generator to the carburetor during the blasting cycle. Backrun steam inlet into the superheater is indicated by the reference numeral 32. In the drawing the full line arrows indicate the course of uprun steam and resultant water gas, and the dotted line arrows indicate the course of backrun steam and resultant water gas.

In the modification of the invention shown in Fig. 2, the carburetor is shown completely unobstructed, i. e., the layers of checkerbrick present at the base of the carburetor in Fig. 1 are omitted. In operation, the generator is blasted with air or other oxygen-containing gas introduced through air inlet 28, the air passing through the fuel bed and raising the temperature thereof until the fuel becomes an incandescent mass. The resultant blast gases pass from the generator into the passage 8 where secondary air is introduced thereinto through inlet 31. The mixture of air and blast gases passes up through the carburetor 10 burning therein. Ignition of this mixture is effected by contact of the air and blast gases with the floor of the carburetor and the checkerwork in the base portion thereof. It will be noted that the inlet 9 into the carburetor is of somewhat restricted area as compared with the areas of a section through the pipe 8, thereby causing the gas entering the carburetor to pass partially over the floor before rising in the carburetor. The conduit 8 and the floor, which preferably are constituted of refractory material, function to ignite the mixture of air and blast gases entering the carburetor. To insure ignition of the air and blast gases, layers of checkerbrick, three or more, as shown in Fig. 1, may be employed at the base of the carburetor. From the carburetor, the gases pass into the superheater flowing through passes 18 and 19 and leaving the superheater through the stack valve 22.

When the fuel bed in the generator and the carburetor and superheater have been brought to the requisite temperatures, flow of air to the generator and secondary air to the carburetor is shut off and an uprun cycle begun. Steam is passed into the base of the generator through inlet 29 and passes up through the fuel bed reacting therewith to form water gas. The water gas thus formed passes through the conduit 8 and up through the carburetor countercurrent to the downwardly flowing stream of oil admitted through the spray 13. The hot gases rise through the carburetor countercurrent to the descent of liquid oil. Hence, efficient admixture of the oil and gas results. The portion of the carburetor devoid of checkers is of such extent that the oil is vaporized before it strikes the checkerbrick at the base of the carburetor, the oil vapors and water gas passing to the superheater. The mixture of oil gas and water gas passes through the superheater where it is fixed, leaving the superheater through gas offtake 23. From the superheater, the carbureted water gas formed passes into the washbox 26 from which it may pass through outlet 27 to a suitable holder.

Carbonaceous material formed by the decomposition of the oil settles into the base portion of the carburetor, through the upflowing gas stream which vaporizes any oil adhering to the carbonaceous material. Due to the settling of the carbonaceous deposit through the upflowing water gas stream, and further, due to the fact that the water gas as it leaves the fuel bed and at a relatively high temperature first contacts with the carbonaceous deposit at the base of the carburetor and then flows up through the carburetor, efficient utilization of the volatile content of the oil to enrich the uprun gas is effected. The carbonaceous deposit thus formed is burned during a subsequent blasting cycle. Combustion of this deposit is supported by secondary air admitted into conduit 8 through air inlet 31. In the case of heavy oils forming excessive deposits, additional air may be admitted through the bustle pipe 12 into contact with the deposit on the checkerbrick 11 to effect removal of the deposits.

The steam uprun period may be immediately followed by a steam backrun or downrun period although a backrun is preferred. Steam may be admitted at 32 or 30, depending upon whether a backrun or downrun, respectively, is employed. The steam admitted at 32 is superheated in its passage through the superheater and carburetor and passes into the top of the generator. The steam superheated by passage over the brick in the superheater and its downflow through the carburetor exerts a maximum cleaning effect on the brick in the base of the carburetor. Concurrently with the introduction of the steam into the top of the generator, oil may be admitted through spray 6, the resultant mixture of oil vapors and steam passing through the fuel bed. The carbureted water gas thus formed leaves the generator through the backrun line 25 and passes to the washbox 26. The carbonaceous residue formed by the decomposition of the heavy oil or tar is deposited on the top of the fuel bed where it is consumed in the gas-making process.

It will be noted that in accordance with this invention, the hot gases rise in the carburetor while the liquid oil particles fall vertically. Hence, each fluid follows its natural tendency and due to this employment of the true countercurrent flow principle, efficient vaporization and admixture of the resultant oil vapors with water gas results. Carbonaceous material formed in the cracking of the oil settles through the upflowing gas stream and finally comes to rest at the base of the carburetor where it is contacted with the water gas immediately after the water gas leaves the generator and immediately upon its entry into the carburetor. Hence, maximum utilization of the volatile content of the oil to enrich the uprun gas results.

It will be further noted that the invention herein is readily applicable to existing sets since to adapt such sets to the practice of this invention, it is only necessary to remove the checkerbrick from the carburetor, leaving, if desired, two or three layers near the base portion, change the connection from the generator to the carburetor so that it leads into the base of the carburetor and provide the superheater with a vertical baffle corresponding to partition or baffle 17.

Since certain changes may be made in carrying out this invention without departing from its scope, it is intended that all matter contained in the above description shall be interpreted as illustrative and not in a limiting sense.

I claim:

1. In a carbureted water gas process involving the step of blasting a fuel bed in a generator and the burning of the resultant blast gases in a carburetor and superheater connected with the generator, alternating with the step of making carbureted water gas by (a) passing steam through the fuel bed and passing the resultant water gas through the carburetor, introducing heavy oil into the water gas passing through the carburetor and fixing the resultant carbureted water gas by passage through the superheater, and (b) passing steam in reverse flow through the superheater, carburetor, and into and through the generator and withdrawing the resultant water gas from the generator, the improvement which comprises igniting the blast gases substantially immediately upon their introduction into the base of the carburetor and passing the burning blast gases always upwardly through the carburetor, passing water gas in step (a) always upwardly through the carburetor and introducing liquid heavy oil in a downward direction into the upflowing gas stream so that the liquid heavy oil particles and the water gas follow their natural flow tendencies, and in step (b) passing steam always downwardly through the carburetor, introducing the heated steam into the top of the generator while simultaneously adding heavy oil to the generator, passing the mixture of oil gas and steam through the fuel bed in the generator and withdrawing the resultant carbureted water gas from the generator.

2. A three-step process of making carbureted water gas in a set comprising a generator, carburetor and superheater connected in series, step (1) comprising blasting the generator, introducing the blast gases admixed with secondary air into the base of the carburetor, igniting the mixture substantially immediately upon its entrance into the base of the carburetor, and passing the burning blast gases upwardly through the carburetor and into and through the superheater, step (2) comprising an uprun of steam through the generator and passing the resultant water gas into the base of the carburetor and flowing it always upwardly therethrough while introducing oil in a downward direction into the upflowing gas stream, and passing the resultant water gas through the superheater, and step (3) comprising the passage of steam in a reverse flow through the superheater, down through the carburetor, and the passage of the resultant superheated steam into the top of the generator where it is mixed with heavy oil, the resultant mixture of oil gas and steam being passed down through the fuel bed, and the carbureted water gas withdrawn from the generator.

3. A process for producing carbureted water gas in a water gas set which involves a generator having a bed of fuel therein, a carburetor having its base portion communicably connected with the top of the generator and a two-pass superheater connected with the top of the carburetor, said carburetor being substantially unobstructed, and the generator, carburetor, and superheater being located in separate and detached shells, which comprises passing air through the generator, passing the resultant blast gases admixed with secondary air into the base of the carburetor, effecting substantially immediate ignition of the mixture upon its entrance into the base of the carburetor, and passing the burning blast gases upwardly through the carburetor, discontinuing the aforesaid blasting cycle, and passing steam up through the fuel bed in said generator, passing the resultant water gas up through said carburetor, providing a downwardly directed spray of oil at the top of said carburetor, mixing the vaporized oil with the water gas, and causing the resultant carbonaceous material formed in the carburetor by the decomposition of said oil to settle through the upflowing water gas stream and be deposited at the base of said carburetor, and passing the resultant carbureted water gas from said carburetor into and through said superheater to fix said gas.

4. A process for producing carbureted water gas in a water gas set which involves a generator having a bed of fuel therein, a carburetor having its base portion communicably connected with the top of the generator, and a superheater connected with the top of the carburetor, said carburetor being substantially unobstructed, which comprises passing air through the generator, passing the resultant blast gases admixed with secondary air into the carburetor, igniting the mixture of blast gases and secondary air substantially immediately upon their entrance into the carburetor, and passing the resultant gases through the carburetor, discontinuing the aforesaid blasting cycle and passing steam up through the fuel bed in said generator, passing the resultant water gas up through said carburetor, providing a centrally located downwardly directed spray of oil in the top of said carburetor, mixing the vaporized oil with the water gas and depositing the resultant carbonaceous material formed in the carburetor by the decomposition of said oil at the base of said carburetor, passing the resultant carbureted water gas from said carburetor into and through said superheater to fix said gas, and discontinuing the aforesaid carbureted water gas making cycle and passing steam in a reverse direction through the superheater, down through the carburetor where the superheated steam contacts with the carbonaceous material at the base of the carburetor, then passing the steam leaving the carbonaceous material in the carburetor down through the fuel bed in the generator while simultaneously introducing oil into the generator and withdrawing the resultant water gas from the generator.

5. A carburetor comprising a side base inlet connected to a generator adapted to contain a bed of fuel, for flow of blast gases and water gas from the generator always upwardly through the carburetor, a top outlet connected to the top of a superheater, said carburetor having refractory material located in the base portion only thereof occupying a minor portion of the interior volume of the carburetor for igniting the mixture of air and blast gases introduced through the side base inlet and passed over the said refractory material during the upward flow of the mixture through the carburetor, and an oil spray located at the top of the carburetor for passing oil downwardly counter-current to the upwardly flowing stream of water gas passing therethrough.

6. A process of making carbureted water gas in a set comprising a generator, a carburetor having heat storing refractory material extending across the lower portion thereof only occupying a minor portion of the volume of the carburetor, the remaining major portion of the volume of the carburetor interior throughout the horizontal cross-sectional area thereof being unobstructed, and a superheater, said generator, carburetor and superheater being connected in series for flow of gas from said generator upwardly through said carburetor, from the top of said carburetor into the top of and through said superheater, comprising the following steps: (1) blasting the generator fuel bed, adding air to the blast gases, igniting the mixture of air and blast gases by passing them over the said refractory material in the base of the carburetor and then passing them upwardly through the carburetor and through the superheater, and (2) passing steam into the generator fuel bed and passing the resultant water gas into the base of the carburetor over said refractory material in the base thereof, passing the water gas always upwardly to the top of the carburetor, introducing oil from a location above said refractory material downwardly counter-current to the upflowing water gas stream whereby the oil is cracked and carbon formed settles downwardly through the upflowing water gas stream to vaporize any oil adhering to the carbon particles, and passing the resultant carbureted water gas from the top of the carburetor into the top of and through the superheater.

7. In a carbureted water gas process involving (1) the step of blasting a fuel bed in a generator and the burning of the resultant blast gases admixed with secondary air in a carburetor and superheater connected with the generator, alternating with (2) the step of making water gas by (a) passing steam through the fuel bed and passing the resultant water gas through the carburetor, introducing oil into the water gas passing through the carburetor and fixing the resultant water gas by passage through the superheater, and (b) passing steam in reverse flow through the superheater and carburetor, into and through the generator, and withdrawing the resultant water gas from the generator, the improvement which comprises passing the blast gases admixed with secondary air in step "1" into the base of the carburetor, igniting the mixture substantially immediately upon its entrance into the base of the carburetor, passing the burning blast gases always upwardly through the carburetor, in step 2a passing the water gas always upwardly through the carburetor and from the top of the carburetor into the top of the superheater and introducing liquid oil in a downward direction into the up-flowing gas stream so that the liquid oil particles and the water gas follow their natural flow tendencies and substantially the entire path of flow through the carburetor is available for cracking liquid oil particles, and in step 2b passing steam always downwardly through the carburetor so that it exerts a maximum cleaning effect on the carburetor.

CHARLES V. McINTIRE.